Patented June 6, 1944

2,350,804

UNITED STATES PATENT OFFICE 2,350,804

DERIVATIVES OF HESPERIDIN AND PROCESS FOR PREPARING THE SAME

Masaki Ohta, Osaka, Japan; vested in the Alien Property Custodian

No Drawing. Application August 26, 1940, Serial No. 354,330. In Japan July 22, 1939

5 Claims. (Cl. 260—210)

This invention relates to improvements in a process for preparing a derivative of hesperidin, which derivative is a new chemical substance, soluble in water and useful for therapeutical purposes.

Hesperidin (5-7-3'- trioxy - 4'- methoxyflavanone glucoside) which has the constitutional formula

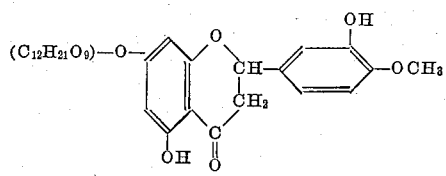

has pharmacological effects, but it is difficultly soluble in water, alcohol and other ordinary solvents at room temperature so that it is very inconvenient for handling.

When an aqueous solution of a caustic alkali, e. g. potassium hydroxide or sodium hydroxide, is added to hesperidin, the latter is dissolved and produces the corresponding alkali metal salt, which when treated with an alkyl halogencarbonate such as ethyl chlorocarbonate in a solvent, alcohol, benzol, etc., causes a reaction to take place, separating alkali metal halide and introducing carbalkoxy radical.

This product is a new chemical substance which is easily soluble in water, hot alcohol and hot ethyl acetate, and its aqueous solution shows a reddish brown colour with ferric chloride. If metallic magnesium is added to its alcoholic hydrochloric acid solution a bright red colour appears.

The chemical reactions above mentioned are shown by the following formulae.

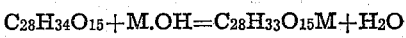
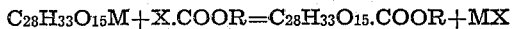

In these formulae, the notation M represents an alkali metal, X represents a halogen atom and R an alkyl radical.

Example 1

10 parts of hesperidin are dissolved in about 150 parts of 2% aqueous solution of potassium hydroxide, 4 parts of ethyl chlorocarbonate are added, and the mixture is allowed to stand for a few hours. A very small quantity of sediment produced is removed by filtration and the filtrate is evaporated under vacuum when a viscous residue is obtained.

This residue is extracted with hot alcohol so as to remove insoluble potassium chloride, and a jelly-like sediment is obtained when the alcoholic solution is cooled. This sediment is collected by filtration and is re-crystallized from alcohol. When the product is dried in vacuum at 100° C., 8 parts of slightly yellowish powder are obtained, which melts at 135° C. under decomposition. It is ascertained by analysis that this is a new chemical substance having the chemical formula $C_{31}H_{38}O_{17}$.

This new substance is easily dissolved in a dilute caustic alkali solution and produces hesperidin, the starting material. If it is boiled with a mineral acid, sugars and aglycone are produced.

Example 2

10 parts of hesperidin are stirred for an hour with a solution of 8 parts sodium in 500 cc. alcohol, then 4 parts of ethyl chlorocarbonate are added and the mixture is refluxed for two hours. Sodium chloride produced therein is filtered off while hot, and the alcoholic solution is evaporated down to a small amount, from which jelly-like precipitates are obtained. Recrystallizing from alcohol, the same product as that of the Example 1 is obtained. The yield is 7 parts.

What I claim is:

1. A process for preparing a carbalkoxylate of hesperidin which comprises mixing an aqueous solution of an alkali metal salt of hesperidin with a lower alkyl halogencarbonate and allowing the mixture to stand for several hours.

2. A process for preparing a carbalkoxylate of hesperidin which comprises dissolving hesperidin in an aqueous solution of caustic alkali, adding to the alkali metal salt thus produced a lower alkyl halogencarbonate, filtering the solution, evaporating the filtrate and extracting the residue with a solvent.

3. A process for preparing a carbalkoxylate of hesperidin which comprises dissolving hesperidin in an aqueous solution of caustic alkali, adding to the alkali metal salt thus produced a lower alkyl halogencarbonate in a solvent, filtering the solution, evaporating the filtrate and extracting the residue with a solvent.

4. The hesperidin compound of the formula

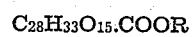

wherein R represents a lower alkyl radical, said compound being readily soluble in water and being useful for therapeutic purposes.

5. The hesperidin compound of the formula

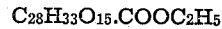

said compound being readily soluble in water and being useful for therapeutic purposes.

MASAKI OHTA.